United States Patent [19]

Murphy

[11] Patent Number: 4,745,666
[45] Date of Patent: May 24, 1988

[54] SPRING CLIP FOR SHEET METAL CONSTRUCTION

[75] Inventor: Wesley T. Murphy, Auburn, N.Y.

[73] Assignee: Etco Building Systems, Inc., Auburn, N.Y.

[21] Appl. No.: 76,472

[22] Filed: Jul. 17, 1987

[51] Int. Cl.[4] .............................................. F16B 5/06
[52] U.S. Cl. ........................................ 24/453; 24/295; 24/336; 403/408.1
[58] Field of Search .................. 24/453, 336, 293–295, 24/458, 573, 618; 411/508, 516, 522, 520; 403/408.1, 388, 397, 405.1; 248/221.2, 221.4, 223.3; 52/729, 693, 730, 732

[56] References Cited

U.S. PATENT DOCUMENTS

| | | | |
|---|---|---|---|
| 2,659,951 | 11/1953 | Tinnerman | 24/295 |
| 3,066,902 | 12/1962 | Conil | 24/339 X |
| 4,389,829 | 6/1983 | Murphy | 52/693 |
| 4,440,363 | 4/1984 | Brand | 403/405.1 X |

FOREIGN PATENT DOCUMENTS

| | | | |
|---|---|---|---|
| 560899 | 1/1959 | Italy | 24/295 |
| 1114701 | 5/1968 | United Kingdom | 248/221.2 |

Primary Examiner—Kenneth J. Dorner
Assistant Examiner—James R. Brittain
Attorney, Agent, or Firm—Wall and Roehrig

[57] ABSTRACT

A quick-set button or clip formed of a strip of spring metal has the general shape of the Greek letter omega, and joins halves of a two-part sheet metal beam or joist. The clip has an insertion bight formed at one end of a main elongated portion, and a Vee spring arm at the other end. The insertion bight has an offset portion, an outward leg and a return leg, and a diagonal portion that extends to a stub located at the underside of the main portion. The insertion bight and the Vee spring arm are inserted into corresponding aligned slots in the sheet metal web of the beam or joist, and spring action of the quick set button or clip holds the clip and the joist or beam forming members securely together.

5 Claims, 1 Drawing Sheet

SPRING CLIP FOR SHEET METAL CONSTRUCTION

BACKGROUND OF THE INVENTION

This invention relates to sheet metal building construction, and is more particularly directed to means for joining flat members to form beams, purlins, joists, and the like. More specifically, the present invention involves a metal clip or button that secures two flat metal halves together to form the metal beam, purlin, or joist.

A spring-like metal clip of this general type has been disclosed in my earlier U.S. Pat. Nos. 4,388,789 and 4,389,829. This type of clip or button is generally satisfactory, but it was desired to provide an improved clip which gives a more positive seating of the clip into the two members that it joins, and which will accommodate the usual stresses in the building over time without weakening. It was also desired that the improved clip or button provide a positive interlock in the pieces it joins without requiring any special tools.

OBJECTS AND SUMMARY OF THE INVENTION

It is one object of this invention to improve the techniques for constructing structures.

It is a further object of this invention to provide a spring metal clip or button which securely joins halves of a sheet metal beam, joist, or other structural member, which improves over and avoids the drawbacks of the prior art.

It is another object of this invention to provide a spring clip or button which snaps into place and which holds securely.

According to an aspect of this invention, the clip or quick-set button is formed of a strip of spring steel and has a generally omega-shaped configuration. The clip has a main elongated straight portion and has an insertion arm, in the form of a bight at one end and a Vee spring anchor arm at the other end. The Vee spring arm has a leg extending generally perpendicular from the end of the straight portion and an anchor leg extending back from the end of that leg. The insertion arm is in the form of a flattened bight including an offset extending perpendicular from the one end of the straight portion, an insertion bight that extends from the offset and parallel to the main straight portion to a bend and thence back to said offset, a diagonal portion extending from the insertion bight to said main straight portion, and a stub extending from the diagonal portion and running alongside the main straight portion. The free end of the stub is disposed approximately midway from the one end to the other end of said main straight portion.

The above and many other objects, features, and advantages hereof will be apparent from the ensuing detailed description, which is to be read and construed in light of the accompanying drawing.

DETAILED DESCRIPTION OF A PREFERRED EMBODIMENT

Figure 1:
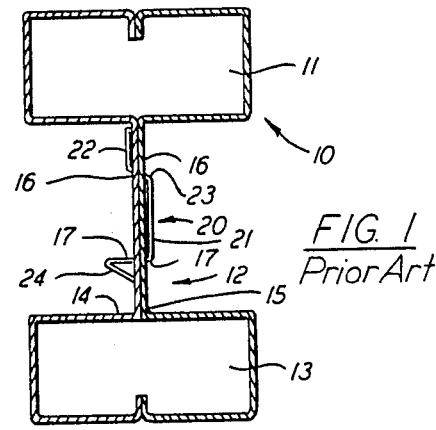
FIG. 1 is a sectional view of a two piece sheet metal joist, which is held together by a clip of the conventional type.

With reference to the drawing, FIG. 1 illustrates a sheet metal beam or joist 10 which is of the general construction as illustrated in my U.S. Pat. No. 4,388,789. This is a two-piece box flange type I-beam with an upper box flange 11, a web 12, and a lower box flange 13. The joist 10 is formed of a left sheet metal member 14 and a right sheet metal member 15, which are disposed to face one another to form the web 12. The members 14 and 15 each have an upper slot 16 and a lower slot 17. The upper set of slots 16,16 and the lower set of slots 17,17 are disposed in registry to receive a clip 20 of the conventional type. This clip 20 has a main elongated portion 21 which extends between the pairs of slots 16,17; an insertion arm 22 at one end of the main portion 21 which is joined thereto by an offset 23 and which penetrates the upper slot 16; and a Vee spring arm 24 at the other end of the main portion 21 which is inserted into the slots 17 and retains the clip 20 on the web 12.

Figure 2:
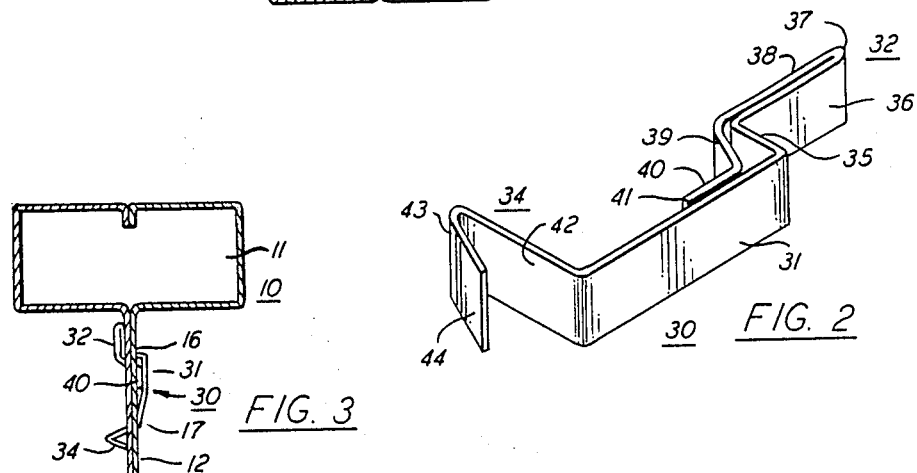
FIG. 2 is a perspective view of a metal spring clip according to one embodiment of this invention.
Figure 3:
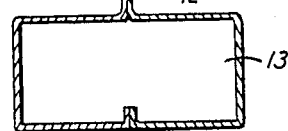
FIG. 3 is a sectional view of the two piece joist of FIG. 1 but held with the clip of FIG. 2

Now, with reference to FIGS. 2 and 3, an improved clip 30, constructed according to one embodiment of this invention, is employed to join together the two sheet metal members 14 and 15 to form the sheet metal box-flange joist 10.

Figure 4A:
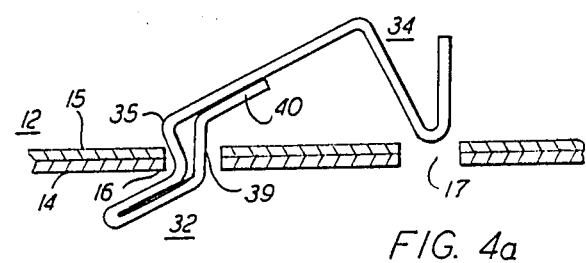
FIGS. 4A, 4B, and 4C are sequential sectional views which illustrate the manner in which the clip of this invention is inserted into facing sheet metal members.
Figure 4B:
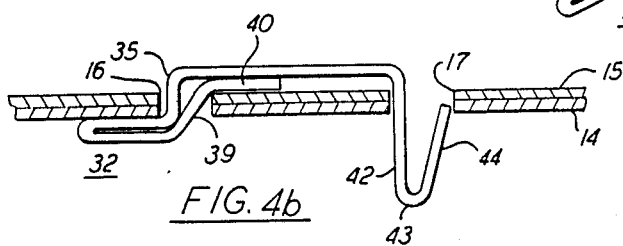
Figure 4C:
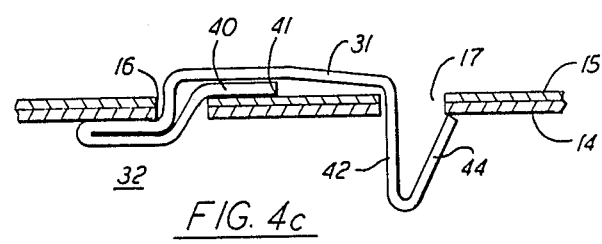

The clip 3 is unitarily formed of a strip of spring steel or other spring metal, and is generally in the shape of a flattened greek letter omega, as better shown in FIGS. 4A–4C. This clip 30 has a main elongated portion 31 with a flattened insertion bight 32 forming the insertion arm at one end of the main portion 31, the insertion bight 32 being inserted into the upper slot 16; and a Vee spring arm 34 at the other end of the main portion 31, which is inserted into the lower slots 17. The insertion bight 32 has an offset portion 35, that extends at a right angle from the main portion 31, a leg 36 which extends outward from the end of the offset 35 and parallel to the main elongated portion 31, a 180° bend 37, a return leg 38 which extends from the bend 37 back to the position of the offset portion 35, and a diagonal portion 39 that extends from the end of the return leg 38 to an underside of the main portion 31. A stub 40 extends alongside the main portion 31 and has a free end 41 at a position more or less halfway between the ends of the main portion 31.

At the other end of the clip 30, the Vee spring arm 34 has a leg 42 extending at a right angle to the main portion 31, an acute angle bend 43, and an anchor leg 44 which extends outwardly back toward the plane of the main portion 31. As illustrated here, the diagonal portion 39 slopes at an angle of about 60°, that is, the portion 39 makes an angle of about 120° with respect to the stub 40 and with respect to the return leg 38. The bend 43 of the Vee spring arm 34 makes an acute angle of about 30°.

The offset 35 is of such a length that the insertion bight 32 and the stub 40 are in parallel planes that are separated by a distance that is substantially the same as the combined thickness of the two flat sheet metal members 14 and 15 that form the web 12, while the anchor leg 44 has its free end separated from the plane of the main portion 31 by less than the combined thicknesses of the two flat sheet metal members 14,15 and the stub 40. Consequently, for the Vee spring arm 34 to be fully inserted through the slots 17, the main elongated portion 31 must be flexed about the free end 41 of the stub 40.

The insertion of the clip 30 of this invention can be readily explained with respect to FIGS. 4A, 4B, and 4C.

FIG. 4A shows the clip 30 in its early insert position. In this position, the bight 32 has been inserted through the slots 16, and the diagonal member 39 gives a maximum clearance between the opposed sides of the slot openings 16.

FIG. 4B shows the clip 30 in the closed position. In this position, the clip 30 is rotated down. The spread between the offset 35 and the diagonal portion 39 helps align the slot openings. At the same time, the anchor leg 44 of the spring arm 34 is deflected to compress the spring arm 34 as the same passes through the aligned slots 17 until all the metal surfaces, i.e. of the members 14 and 15 and of the clip 30, are in contact. At this point, when the clip surfaces are in contact with the sheet metal web 12, bending space is maintained before actual contact of the main portion 31 is made with the web surface 12.

FIG. 4C shows the clip 30 in its locked position. To reach this position, the anchor leg half of the main portion 31 is deflected downward and against the surface of the sheet metal member 15 as the anchor leg 42 passes completely through both aligned slots 17. Then, the compression on the Vee spring arm 34 is released and the anchor leg 44 extends outward beyond the outer wall of the slot 17. Because of the nature of the spring metal employed in this clip 30, the deflected main portion 31 will tend to straighten itself out, and bias the anchor leg 44 against the outside of the sheet metal member 14. This maintains the clip 30 in the locked position, with the members 14 and 15 firmly held in alignment.

While the insertion button or clip of this invention has been described in detail with reference to a single preferred embodiment, it should be recognized that many possible variations would present themselves to those of skill in the art without departing from the scope and spirit of this invention, as defined in the appended claims.

What is claimed is:

1. An improved metal clip for joining together a pair of flat members which have respective pairs of slots that are aligned in registry with one another defining two sets of registered slots, the clip having a generally omega-shaped configuration and comprising a main elongated straight portion, an insertion arm at its one end to be inserted through one set of the slots and a Vee spring arm at the other end to be inserted through the other set of the slots; the Vee spring arm having a leg extending perpendicular to said main portion and an anchor leg extending back from an end of said leg at an acute angle, and said insertion arm being in the form of a flattened bight including an offset extending perpendicular from said one end of the main portion, an insertion bight portion that extends from said offset and parallel to said main portion to a bend and thence back to said offset, a diagonal portion extending from said insertion bight portion to said main portion, and a stub extending from said diagonal portion alongside said main portion and having a free end disposed approximately midway from the one end to the other end of the main portion.

2. The improved metal clip of claim 1 in which said metal clip is unitarily formed of a strip of spring steel.

3. The improved metal clip of claim 1 in which said diagonal portion forms an angle of about 120° with said stub.

4. The improved metal clip of claim 1 in which said insertion bight portion and said stub are in parallel planes that are separated by a distance substantially the same as the combined thickness of the two flat members to be joined.

5. The improved metal clip of claim 4 in which said anchor leg has its free end separated from the plane of said main portion by less than the combined thickness of said two flat members and said stub, so that for said Vee spring arm to be fully inserted into said other set of slots in said flat members, said main portion must be flexed about the end of said stub.

* * * * *